Patented Dec. 29, 1931

1,838,267

UNITED STATES PATENT OFFICE

HANS KRZIKALLA, OF MANNHEIM, AND FRANZ BLÜMMEL, OF SECKENHEIM, GERMANY, ASSIGNORS TO GENERAL ANILINE WORKS, INC., OF NEW YORK, N. Y., A CORPORATION OF DELAWARE

AZO DYESTUFFS CONTAINING CHROMIUM

No Drawing. Application filed April 4, 1928, Serial No. 267,480, and in Germany April 21, 1927.

This invention relates to the production of azo-dyestuffs containing chromium from 1.3-phenylene-diamine-5-sulfonic acids.

We have found that valuable azo-dyestuffs containing chromium are obtained by coupling 1.3-phenylene-diamine-5-sulfonic acids with diazo-compounds of o-amino-phenols and treating the product thus obtained with agents supplying chromium, for example, by heating or boiling with or without the application of pressure.

The following examples will further illustrate the nature of the said invention which however is not limited thereto. The parts are by weight.

Example 1

42 parts of the azo-dyestuff obtained by coupling diazotized picramic acid and 1.3-phenylene-diamine-5-sulfonic acid are heated in a solution of 9.1 parts of chromium oxid and 15 parts of 85 per cent formic acid in 500 parts of water for 3 hours to from 120 to 125° C. The chromium compound thus obtained which probably corresponds to the formula:

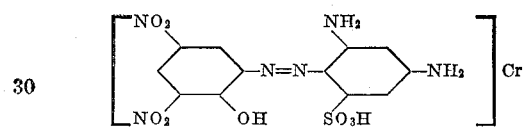

is salted out and dried. It yields a nice fast brown dyeing on wool which is very well equalized. Similar colorations are obtained on leather.

The dyestuff containing chromium obtained in a similar manner from diazotized picramic acid and symmetrical m-tolylene-diamine-sulfonic acid (CH$_3$.NH$_2$.NH$_2$.SO$_3$H=1.2.6.4)

dyes wool a reddish brown color of excellent fastness. The dyeing is excellently equalized. A dyeing with a slightly more yellowish tinge is obtained with the chromium dyestuff derived from diazotized picramic acid and 2-chlor-1.3-phenylene-diamine-5-sulfonic acid.

Example 2

23.3 parts of 4-nitro-2-aminophenol-6-sulfonic acid are diazotized and the solution thus obtained added to a solution containing 22 parts of 1.3-phenylene-diamine-5-sodium sulfonate, which has been rendered alkaline by an addition of sodium carbonate. After stirring for several hours the product is salted out and filtered off by suction. By treating this product with agents supplying chromium as described in Example 1, a dyestuff is obtained which dyes wool in beautiful fast brown shades and corresponds probably to the formula:

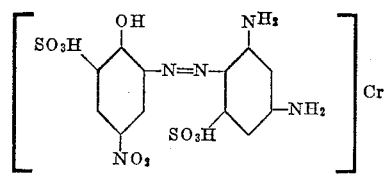

An excellent dyestuff may be obtained in a similar manner from 4-nitro-2-amino-phenol.

What we claim is:—

1. As new articles of manufacture azo-dyestuffs containing chromium which dye wool and leather brown and which are considered to be the complex chromium compounds of the azo dyestuffs having the probable formula:

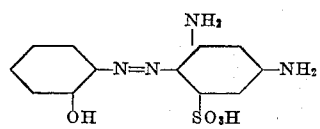

in which the nuclear hydrogen atoms may be replaced by a substituent selected from the group consisting of —NO$_2$, —Cl, —CH$_3$ and —HSO$_3$.

2. As new articles of manufacture azo-dyestuffs containing chromium which dye wool and leather brown and which are considered to be the complex chromium compounds of the azo dyestuffs having the probable formula:

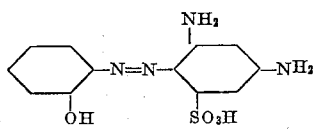

in which at least one of the nuclear hydrogen atoms in the aminophenol component is substituted by a nitro group and in which the remaining nuclear hydrogen atoms may be replaced by a substituent selected from the group consisting of $-NO_2$, $-Cl$, $-CH_3$ and $-HSO_3$.

3. As a new article of manufacture the azo-dyestuff containing chromium which dyes wool in nice fast brown shades which are very well equalized and which dyestuff is considered to be the complex chromium compound of the dyestuff having the probable formula:

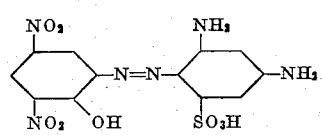

In testimony whereof we have hereunto set our hands.

HANS KRZIKALLA.
FRANZ BLÜMMEL.